Patented Aug. 7, 1951

2,563,725

UNITED STATES PATENT OFFICE 2,563,725

PHENOLSULFONAMIDES

Martin E. Hultquist, Bound Brook, and William B. Wright, Jr., Plainfield, N. J., assignors to American Cyanamid Company, New York, N. Y., a corporation of Maine No Drawing. Application May 10, 1949, Serial No. 92,510

4 Claims. (Cl. 260—250)

This invention relates to a method for the preparation of 4-hydroxybenzenesulfonamidoheterocycles.

Certain 4-hydroxybenzenesulfonamidoheterocycles possess in vivo activity against certain neurotropic virus diseases. They may, therefore, become important drugs in the treatment of these and related diseases of man and animals.

An object of this invention is to provide a novel method for the synthesis of these useful compounds.

A further object of this invention is to provide a method of synthesis which lends itself to commercial production.

Further objects and advantages of this invention will be apparent from a study of the disclosure, examples and claims which follow.

We have found that 4-hydroxybenzenesulfonamidoheterocycles can be prepared from certain 4-bromobenzenesulfonamidoheterocycles by alkaline hydrolysis under controlled conditions of temperature and concentration of alkali. We have found that the general class of compounds represented by the formula

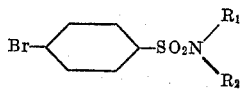

where $R_1$ represents a heterocyclic radical chosen from the group consisting of thiazolyl, pyridyl, pyrazinyl, pyridazinyl, pyrimidyl, and thiadiazolyl, and $R_2$ represents hydrogen or an aliphatic, aralkyl, or heterocyclic radical, can be successfully converted to the corresponding hydroxybenzenesulfonamides by alkaline hydrolysis in the presence of cuprous salts within the temperature range 110–135° C. in the presence of alkali metal hydroxide.

The bromobenzenesulfonamidoheterocycles named above are those in which the heterocyclic moiety is stable under the conditions of our reaction. Bromobenzenesulfonamides with other heterocyclic constituents do not appear to be able to withstand the highly alkaline conditions at the temperatures required for our reaction and the heterocyclic substituent either decomposes or is split off.

The reaction appears under the correct conditions to go by direct substitution from the bromo to the alkali metal salt of the hydroxy compound. However, there are other possible reactions which may and do take place if the temperature falls outside our chosen range. Among these are the splitting off of the heterocyclic radical and/or the decomposition of the heterocycle, the hydroxylation of the benzene nucleus and the formation of the various bis compounds.

At temperature below 100° C. the hydrolysis is very slow, and at temperatures over 135° C. the other reactions are promoted to such a degree that the yield of the presently desired compounds is materially reduced, and the undesired products greatly interfere with the isolation and purification of the subject hydroxybenzenesulfonaminoheterocyclic compounds.

For alkalis in which the hydrolysis can take place we have found that sodium hydroxide, potassium hydroxide, and barium hydroxide are the most effective, when used in the range of concentration of 5–30% as an aqueous solution. Ordinarily, about 10 parts of this alkaline solution are used for one part of sulfonamide. While the alkalis are most commonly used in essentially aqueous solutions, the presence of other inert water miscible solvents in small amounts will do no harm.

The examples show the preparation of N-(2-thiazolyl)-1-phenol-4-sulfonamide and are intended to illustrate the thermal dependence of this useful reaction and to set out the limits of this reaction. It is understood that the invention is not limited to N-(2-thiazolyl)-1-phenol-4-sulfonamides, since N-pyridyl-, N-pyrazinyl-, N-pyridazinyl-, N-pyrimidyl-, and N-thiadiazolyl, phenol-4-sulfonamides can also be made by the process of this invention.

Example 1

Ten parts of N-(2-thiazolyl) bromobenzene-4-sulfonamide and 100 parts of 5N NaOH are mixed and heated on the steam bath for 24 hours. The mixture is acidified with concentrated HCl, and the precipitate is filtered, washed with water, and oven dried. The yield is 9.7 parts. Recrystallization from water results in a 93% recovery of N-(2-thiazolyl) bromobenzene-4-sulfonamide melting at 213–215° C.

Example 2

Ten parts of N-(2-thiazolyl) bromobenzene-4-sulfonamide, 100 parts of 5N NaOH, and 0.5 part of cuprous chloride are placed in a nickel shaking autoclave. Nitrogen is swept through and the mixture is then heated for 23 hours at 125° C. The liquid is washed from the autoclave, treated with charcoal, to remove most of the color, and then acidified with 5N HCl. The precipitate of N-(2-thiazolyl)-1-phenol-4-sulfonamide which formed is filtered off and washed with water. The yield is 52% of the theoretical, melting at 226–230° C.

Example 3

10 parts of N-(2-thiazolyl) bromobenzene-4-sulfonamide, 100 parts of 5N NaOH, and 0.5 part of cuprous chloride are placed in a nickel shaking autoclave. Nitrogen is swept through and the mixture is then heated for 4 hours at 135° C. The liquid is washed from the autoclave, treated with charcoal to remove most of the color, and then acidified at 60–70° C. with 5N HCl. The mixture is heated to 90° C. and filtered hot. The insoluble material melts at 207–210° C. and represents a 46% recovery of N-(2-thiazolyl) bromobenzene-4-sulfonamide. The hot filtrate is treated with activated charcoal, filtered and concentrated to 100 cc. and allowed to cool. N-(2-thiazolyl) phenol-4-sulfonamide melting at 225.5–230° C. is obtained.

We claim:

1. The method of manufacturing compounds of the general formula

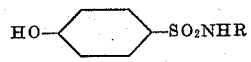

where R is chosen from the group consisting of thiazolyl, pyridyl, pyrazinyl, pyridazinyl, pyrimidyl and thiadiazolyl radicals which comprises hydrolyzing compounds of the general formula

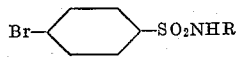

where R is as represented above by heating with an alkali metal hydroxide, in the presence of a cuprous salt.

2. The method of manufacturing compounds of the general formula

where R is chosen from the group consisting of thiazolyl, pyridyl, pyrazinyl, pyridazinyl, pyrimidyl and thiadiazolyl radicals which comprises hydrolyzing compounds of the general formula

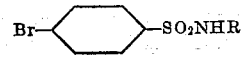

where R is as represented above, by heating with an alkali metal hydroxide at temperatures in the range 110–135° C. in the presence of a cuprous salt.

3. The method of manufacturing compounds of the general formula

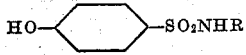

where R is chosen from the group consisting of thiazolyl, pyridyl, pyrazinyl, pyridazinyl, pyrimidyl and thiadiazolyl radicals which comprises hydrolyzing compounds of the general formula

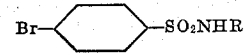

where R is as represented above, by heating with an aqueous solution of sodium hydroxide in the concentration range 5–30% at temperatures in the range 110–135° C. in the presence of cuprous chloride in catalytic amounts.

4. A method for the preparation of N-(2-thiazolyl)phenol-4-sulfonamide which comprises the hydrolysis of N-(2-thiazolyl)bromobenzene-4-sulfonamide in 5–20% sodium hydroxide solution at a temperature in the range 115–125° C. in the presence of a cuprous chloride catalyst.

MARTIN E. HULTQUIST.
WILLIAM B. WRIGHT, Jr.

No references cited.